No. 893,805. PATENTED JULY 21, 1908.
J. KLINE.
FALSE BOTTOM.
APPLICATION FILED MAY 17, 1907.

Witnesses
L. B. James
C. H. Griesbauer

Inventor
JOHN KLINE
by H. B. Willson & Co.
Attorneys

UNITED STATES PATENT OFFICE.

JOHN KLINE, OF MILWAUKEE, WISCONSIN.

FALSE BOTTOM.

No. 893,805.   Specification of Letters Patent.   Patented July 21, 1908.

Application filed May 17, 1907. Serial No. 374,174.

*To all whom it may concern:*

Be it known that I, JOHN KLINE, a citizen of the United States, residing at Milwaukee, in the county of Milwaukee and State of Wisconsin, have invented certain new and useful Improvements in False Bottoms; and I do declare the following to be a full, clear, and exact description of the invention, such as will enable others skilled in the art to which it appertains to make and use the same.

This invention relates to new and useful improvements in false perforated bottoms for stew pans, kettles and the like and has for its object the production of a simple and economical device of this character adapted to be applied in a stew pan, kettle or other cooking utensil and serve to prevent food from burning or sticking to the bottom.

With the foregoing and other objects in view which will appear as the nature of the invention is better understood, the invention consists in certain novel features of construction, combination and arrangement of parts as will be hereinafter fully described and claimed.

Figure 1:
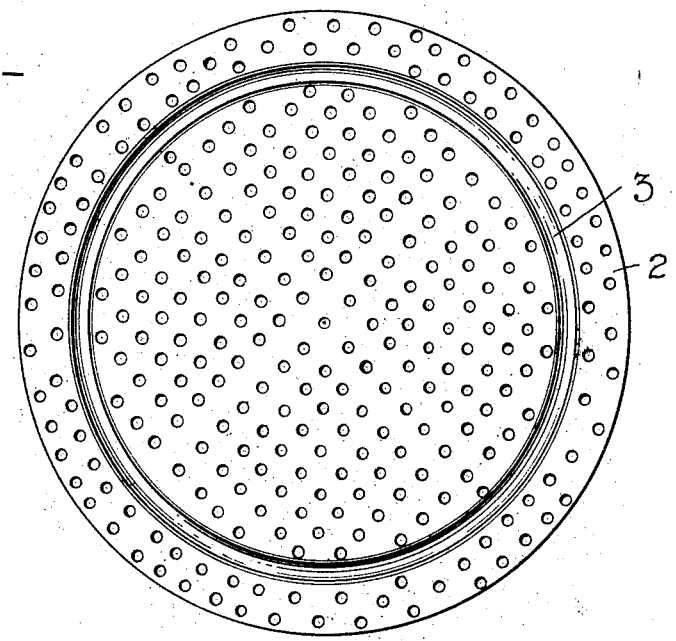
Figure 2:
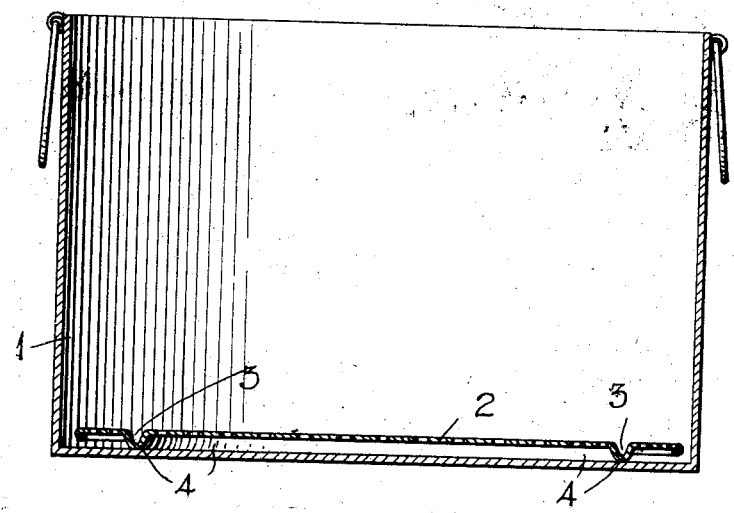

In the accompanying drawings, Figure 1 is a plan view of a false perforated bottom constructed in accordance with my invention; and Fig. 2 is a central vertical sectional view of a cooking utensil with my invention applied therein.

Referring now more particularly to the drawings, the numeral 1 represents a stew pan or other utensil and 2 the false perforated bottom arranged therein. In the preferred embodiment of my invention, said bottom is preferably made in circular form and is provided with an annular indentation 3 in its upper face preferably concentric with its edge to provide an annular spacing rib 4 to hold it above the bottom of a stew pan or other cooking utensil in which it may be applied.

From the foregoing description taken in connection with the accompanying drawings, the construction and operation of the invention will be readily understood without requiring a more extended explanation.

Having thus described my invention, what I claim as new is:—

A false bottom comprising a circular plate having a downwardly projecting beaded outer edge, an annular indentation in said plate forming a downwardly projecting rib remote from the edge of said plate, perforations in said plate, both without and within the circle formed by said indentation, whereby currents of liquid may be induced to pass down on the outside and up on the inside of said rib, the metal of said indentation being free from perforations, all of said plate lying below the plane of the upper face thereof, said plate being adapted to be placed freely in to rest upon the bottom of a cooking utensil, but being entirely unattached therefrom.

In testimony whereof I have hereunto set my hand in presence of two subscribing witnesses.

JOHN KLINE.

Witnesses:
CARL W. ESAU,
CHAS. ESAU.